A. HEDINA.
TORPEDO NET.
APPLICATION FILED MAR. 6, 1918.

1,264,927.

Patented May 7, 1918.

Albert Hedina
INVENTOR.
By George J. Oltsch
ATTORNEY.

UNITED STATES PATENT OFFICE.

ALBERT HEDINA, OF LAPORTE, INDIANA.

TORPEDO-NET.

1,264,927.   Specification of Letters Patent.   Patented May 7, 1918.

Application filed March 6, 1918. Serial No. 220,846.

*To all whom it may concern:*

Be it known that I, ALBERT HEDINA, a subject of Austria, residing at Laporte, in the county of Laporte and State of Indiana, have invented certain new and useful Improvements in Torpedo-Nets, of which the following is a specification.

The invention relates to certain improvements in torpedo nets, and is more particularly adapted for use in connection with vessels as a guard to intercept automobile torpedoes aimed thereat, and prevent same from coming in contact with the hull of the vessel.

The object of the invention resides in the provision of a torpedo net which may be suitably supported laterally of the sides of a vessel and in spaced relation therewith, and extending a sufficient distance below the water line to intercept sub-surface propelled torpedoes, whereby the torpedo will either be caught in the net and prevented from reaching the hull of the vessel, or if exploded through impact with the net the explosion will take place at a sufficient distance from the vessel so as not to seriously injure the same.

A further object of the invention resides in the provision of a torpedo net comprising elements adapted to automatically shift when parts thereof are broken away, as by the impact of a torpedo, or by net cutting devices carried by the torpedo, thereby tending to close the opening thus made in the net and prevent the torpedo from passing entirely through the net by reducing the size of the opening sufficient to prevent its propeller passing therethrough.

The invention in the preferred form of details will be described in the following specification, reference being had particularly to the accompanying drawings, in which.

Figure 1:
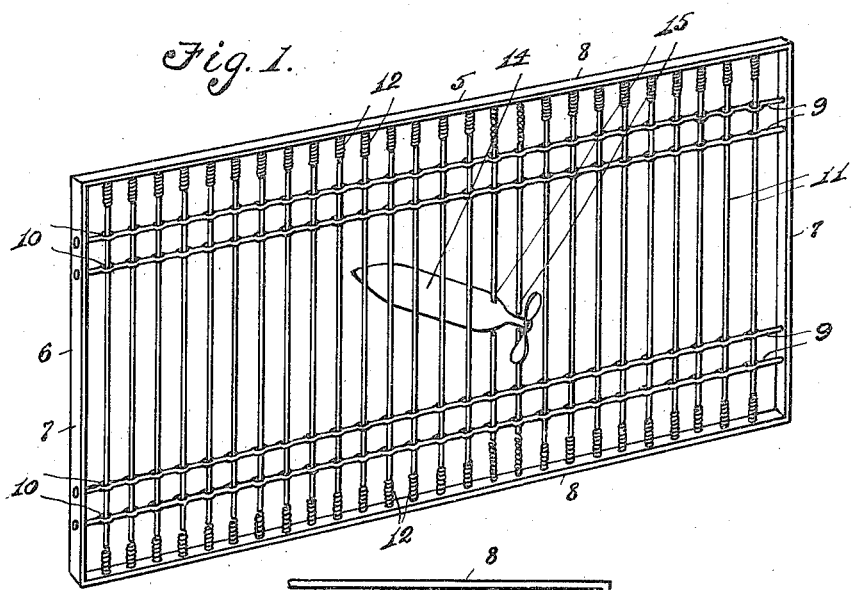
Figure 1 is a perspective view of a net embodying the invention, with the representation of a torpedo which has broken through but is blocked against further progress by the net.

Referring now more particularly to the accompanying drawings, the reference numeral 5 designates a net section, it being contemplated that as many sections may be utilized as occasion may require, and that by constructing same in sections the same may be made of a size and weight to permit same to be easily and quickly handled. The net sections are intended to be suitably supported by booms or other suitable devices carried by the vessel, in end to end relation to jointly form a length equal substantially to the length of the vessel, and in spaced relation therewith. It is also intended that the same be submerged a suitable distance to fully protect the hull of the vessel against sub-surface propelled torpedoes. The particular means for supporting the net sections is not shown or described, as it is intended that any suitable means may be employed for the purpose.

The net preferably consists of a rectangular metallic frame 6, comprising end bars 7, and side bars 8. Extending between the end bars 7 of the frame and suitably fixed thereto, are relatively spaced parallel rods 9 formed with eyes or apertures 10 at intervals throughout their length, the rods being arranged in pairs as shown, and in near proximity with the side bars 8 of the frame. The rods 9 are arranged to have their eyes 10 disposed in vertical alinement, to receive and slidably support for endwise movement a series of closely spaced vertical rods 11 passing through the eyes, thus serving as a support for and as a guide for the vertical rods in the movement thereof.

Figure 2:
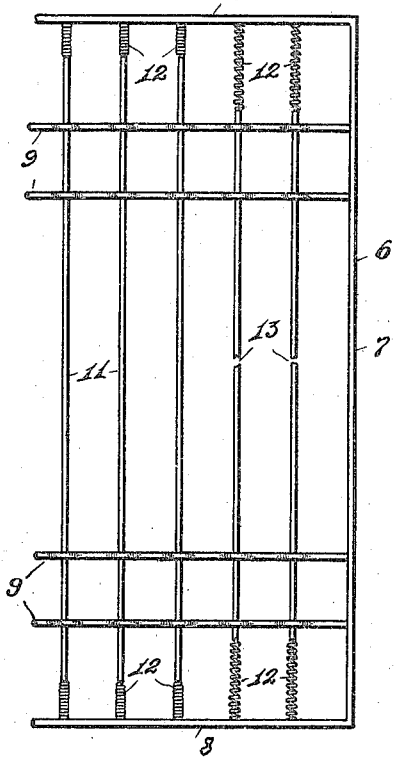
Fig. 2 is an enlarged fragmentary view of the net in side elevation.

Interposed between the respective ends of each vertical rod 11 and the side bars 8 of the frame, are coiled springs 12, which, owing to the length of the rods, hold the springs under tension, so that there is a continual pressure exerted against each end of each of said rods. One spring thus opposes another in connection with the same rod and the latter is thus normally held against endwise movement. The object of these spring actuated rods is to close any gap in the net which may be made by the force of the impact of a speeding torpedo breaking off a length of the rods, upon which occurrence, under the influence of the springs, the severed ends thereof are instantly shifted in the direction of each other, as indicated at 13 in Fig. 2. The practical object of thus automatically shifting the several ends of the rods is shown in Fig. 1, in which a torpedo 14 is shown as having pierced the net by breaking off two of the rods indicated at 15. Owing to the latter immediately shifting as above explained, the ends thereof close the gap sufficiently to prevent the propeller of the torpedo from passing through, thus holding the torpedo trapped in the net and preventing same from reaching the vessel.

The net is thus not only adapted to stop a torpedo under ordinary conditions without breaking the net, but is also operative to prevent a complete piercing thereof due to force of impact, or by being equipped with net cutting devices, by closing the opening made in a manner to prevent the propeller of the torpedo passing through the net.

While the foregoing is the preferred form of my invention, I desire it to be understood that I do not limit myself to the precise structure shown and described, as it is obvious that the same may be variously modified without departing from the spirit of the invention.

Having thus described my invention, what is claimed is:

1. A torpedo net or the like comprising a frame, a plurality of relatively spaced rods carried by the frame, and means for shifting the respective end portions of the rods in the direction of each other upon an intermediate portion thereof being broken off.

2. A torpedo net or the like comprising a frame, a plurality of relatively spaced rods carried by the frame, guide means supporting the rods for endwise movement, and means for coöperating with the rods to shift their respective end portions in the direction of each other upon an intermediate portion thereof being broken away.

3. A torpedo net or the like comprising a frame, a plurality of relatively spaced rods carried by the frame, guide means supporting the rods for endwise movement, and tensioned springs interposed between the respective ends of each rod and the frame.

4. A torpedo net or the like comprising a frame, a plurality of relatively spaced rods carried by the frame for endwise movement, and means for automatically shifting the end portions of the rods in the direction of each other upon an intermediate portion thereof being broken away.

5. A torpedo net or the like comprising a frame, relatively spaced guide members extending longitudinally of and fixed to the frame, said guide members having eyes formed therein at intervals, vertical rods extending through said eyes and adapted for endwise movement, and tensioned springs interposed between the respective ends of the rods and the frame, whereby the respective end portions of the rods will be shifted in the direction of each other upon an intermediate portion thereof being broken away.

In testimony whereof I affix my signature.

ALBERT HEDINA.

Copies of this patent may be obtained for five cents each, by addressing the "Commissioner of Patents, Washington, D. C."